United States Patent
Masakawa (10) Patent No.: US 11,269,704 B2
(45) Date of Patent: Mar. 8, 2022

(54) MEMORY SYSTEM AND CONTROL METHOD THEREOF

(71) Applicant: Toshiba Memory Corporation, Tokyo (JP)

(72) Inventor: Takahiro Masakawa, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 64 days.

(21) Appl. No.: 16/553,438

(22) Filed: Aug. 28, 2019

(65) Prior Publication Data

US 2020/0301770 A1 Sep. 24, 2020

(30) Foreign Application Priority Data

Mar. 20, 2019 (JP) .............................. JP2019-052654

(51) Int. Cl.
*G06F 11/07* (2006.01)
*G06F 11/10* (2006.01)
*G06F 11/30* (2006.01)

(52) U.S. Cl.
CPC ........ *G06F 11/076* (2013.01); *G06F 11/1068* (2013.01); *G06F 11/3037* (2013.01); *G06F 2201/81* (2013.01); *G06F 2201/88* (2013.01)

(58) Field of Classification Search
None
See application file for complete search history.

(56) References Cited

U.S. PATENT DOCUMENTS

| | | | |
|---|---|---|---|
| 8,788,910 B1 * | 7/2014 | Northcott | G06F 11/1012 714/773 |
| 9,071,281 B2 | 6/2015 | Casado et al. | |
| 9,419,655 B2 | 8/2016 | Cai et al. | |
| 9,542,268 B2 | 1/2017 | Chen et al. | |
| 9,906,242 B2 | 2/2018 | Akimoto | |
| 10,200,064 B1 * | 2/2019 | Varnica | H03M 13/116 |
| 2013/0246878 A1 * | 9/2013 | Pancholi | H03M 7/4031 714/752 |
| 2015/0286528 A1 * | 10/2015 | Cai | H03M 13/356 714/763 |

* cited by examiner

*Primary Examiner* — Guerrier Merant
(74) *Attorney, Agent, or Firm* — Kim & Stewart LLP (57) ABSTRACT

A memory system includes a non-volatile memory and a controller. The controller is configured to perform an error correction on data read from a memory region of the non-volatile memory, and set a value of a parameter corresponding to a number of parity bits to be added to write data to be written into the memory region based on a number of data bits corrected in the error correction of the read data in a case where the error correction is successful.

18 Claims, 5 Drawing Sheets

MEMORY SYSTEM AND CONTROL METHOD THEREOF

CROSS-REFERENCE TO RELATED APPLICATIONS

This application is based upon and claims the benefit of priority from Japanese Patent Application No. 2019-052654, filed on Mar. 20, 2019, the entire contents of which are incorporated herein by reference.

FIELD

Embodiments described herein relate generally to a memory system and a control method thereof.

BACKGROUND

A process called a "patrol read" is executed with respect to a non-volatile semiconductor memory. A patrol read includes a process of periodically, or upon an occurrence a particular event, executing a reading of the non-volatile semiconductor memory and then determining an amount of wear or deterioration of the non-volatile semiconductor memory from the reading execution result.

DETAILED DESCRIPTION

One embodiment provides a memory system that sets an error correction capability according to an amount of wear or deterioration of a non-volatile memory.

In general, according to an embodiment, a memory system includes a non-volatile memory and a controller. The controller is configured to perform error correction on data read from a memory region of the non-volatile memory, and set a value of a parameter corresponding to a number of parity bits to be added to write data to be written into the memory region based on a number of data bits corrected in the error correction of the read data in a case where the error correction is successful.

Hereinafter, example embodiments of the present disclosure will be described with reference to the accompanying drawings. Further, in the following description, substantially the same components and functions are denoted by the same reference numeral and repeated description may be omitted.

First Embodiment

In the first embodiment, description will be made of a memory system that sets an error correction capability according to an amount of wear or deterioration of a non-volatile memory that is determined via a patrol read. A control method of the memory system is also described. Further, in the first embodiment, as the error correction number, an error correction bit number (also referred to as a fail bit count) is used to indicate the number of bits that must be corrected and restored by error correction.

In the first embodiment, for example, the patrol read includes a process of reading an entire storage area or a portion of a storage area of the non-volatile memory and a process of determining the amount of wear or deterioration of the area in which the read data are stored based on a decoding result of the read data. The patrol read may be performed periodically and/or when a predetermined condition is satisfied. As a result of the patrol read, the error correction capability for a read source area of the corresponding data may be increased as necessary.

The memory system according to the first embodiment is a storage device such as a solid state drive (SSD). The same configuration and function as the memory system according to the first embodiment may be applied to various types of non-volatile storage devices that include, for example, a hard disk drive (HDD), a universal serial bus (USB) memory, a memory card, a hybrid type memory system including a hard disk drive and a SSD, an optical disk device, and the like.

In the first embodiment, metadata including error correction capability information is associated with each storage area of the non-volatile memory. The memory system sets the error correction capability based on the particular metadata for each storage area, and when data moves from any storage area to another storage area (e.g., by garbage collection (compaction), refresh, wear leveling, etc.), the memory system changes an error correction code (ECC) included in data according to the error correction capability set for the particular storage area to which the data are moved. When the memory system increases the error correction capability information for the read source area of the data, the memory system updates the metadata corresponding to the read source area and increases the error correction capability (e.g., robustness of ECC is increased to permit reliable handling of higher error rates) for the read source area of the data. Data itself read from the read source area are subsequently written to, for example, another storage area in the non-volatile memory.

Figure 1:
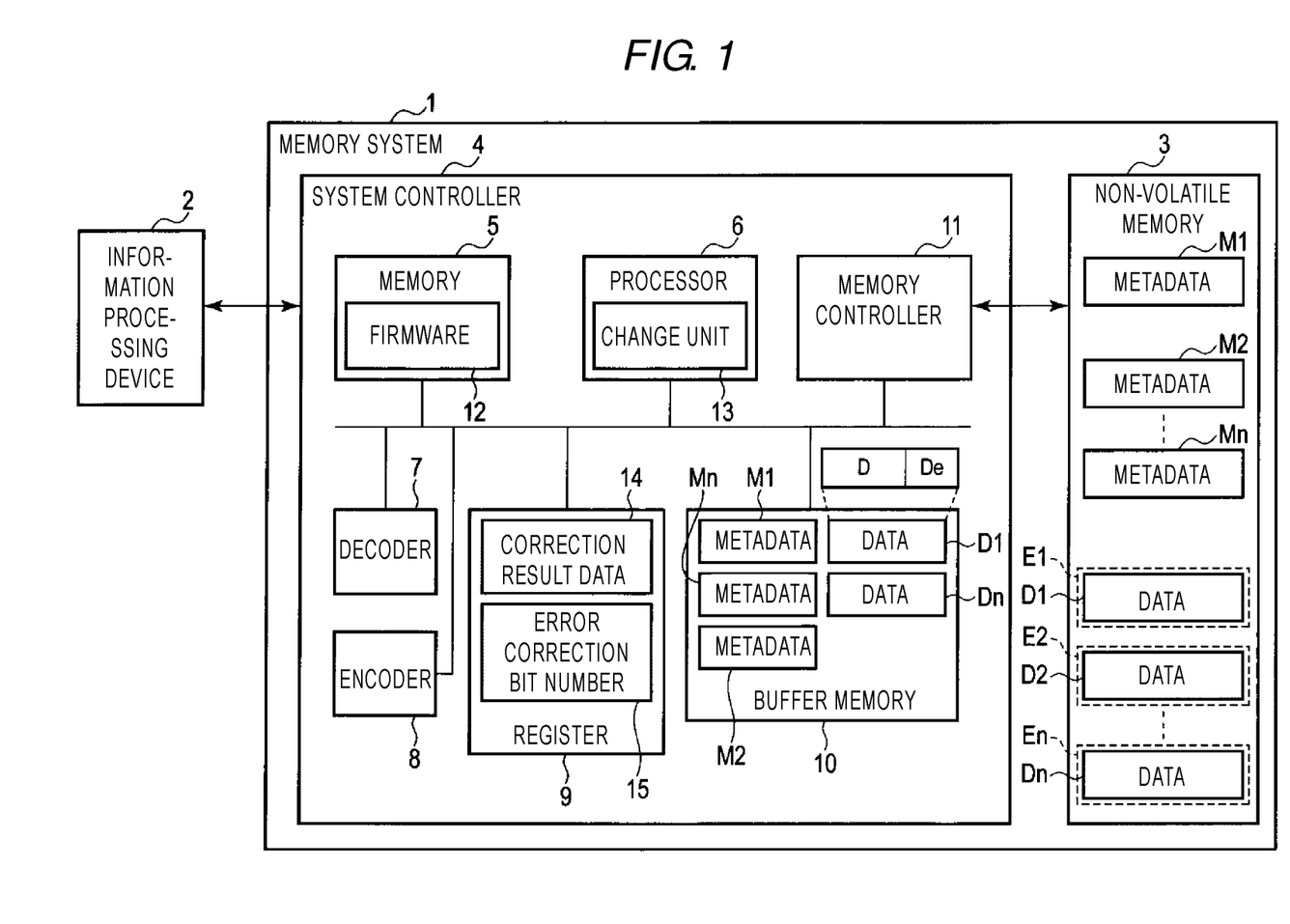
FIG. 1 is a block diagram illustrating an example of a configuration of a memory system according to a first embodiment.

FIG. 1 is a block diagram illustrating an example of a configuration of a memory system 1 according to a first embodiment.

The memory system 1 is connected to communicate with an information processing device 2. The information processing device 2 may be called a host device. The information processing device 2 may be provided in, for example, a personal computer, a server device, a client device, a cellular phone, a mobile information terminal, etc.

The memory system 1 includes a non-volatile memory 3 and a system controller 4.

The non-volatile memory 3 adopts, for example, a NAND-type flash memory, but may be other non-volatile semiconductor memories including a NOR-type flash memory, a Magnetoresistive Random Access Memory (MRAM), a Phase-change Random. Access Memory (PRAM), a Resistive Random. Access Memory (ReRAM), a Ferroelectric Random Access Memory (FeRAM), etc. For example, the non-volatile memory 3 includes a magnetic memory, a 3D structure semiconductor memory, and the like.

Reading and writing data from and to the non-volatile memory 3 may be performed in units called a page. Erasing data to the non-volatile memory 3 may be performed in units called a block. Each block includes several pages. Each of reading and writing data from and to the non-volatile memory 3 may be executed on multiple pages and erasing may be executed on multiple blocks.

The non-volatile memory 3 stores at least written data D1 to Dn, and metadata M1 to Mn including the error correction capability information for storage areas E1 to En in which the data D1 to Dn are stored. The respective storage areas E1 to En are areas managed using the metadata M1 to Mn. Further, groups of metadata M1 to Mn may be handled as one management unit or each of metadata M1 to Mn may be handled as individual management units. The data D1 to Dn may be handled in management units less than one page in size, management units of one page in size, or management units of multiple pages in size.

The metadata M1 to Mn correspond to, for example, the storage areas E1 to En, respectively, and include the error correction capability information for the storage areas E1 to En, respectively. In the first embodiment, the error correction capability information includes, for example, an error correctable bit number, but in other examples the error correction capability of the ECC may be managed by using a bit number of the ECC or a ratio of the ECC included in the data.

The system controller 4 includes a memory 5, a processor 6, a decoder 7, an encoder 8, a register 9, a buffer memory 10, and a memory controller 11.

The system controller 4 executes a control for the non-volatile memory 3. The entirety or a part of the system controller 4 according to the first embodiment may be formed by an electronic circuit. The system controller 4 may be formed as, for example, a system-on-a-chip (SoC). Each function of the system controller 4 may be implemented by dedicated hardware and as described below, the processor 6 may be implemented by executing software such as firmware 12.

When the system controller 4 receives, for example, a write command, a logical address, and data from the information processing device 2, the system controller 4 performs uses the encoder 8 to encode data so as to be error-correctable. In addition, the system controller 4 executes a process of writing the encoded data to a position where a physical address is indicated in the non-volatile memory 3. The system controller 4 manages an address conversion table that enables an address conversion between the logical address of data and the physical address of a write destination area.

When the system controller 4 receives, for example, a read command and the logical address from the information processing device 2, the system controller 4 performs an address conversion of converting the logical address into the physical address using the address conversion table, and executes a process of reading data from the position indicated by the physical address in the non-volatile memory 3. In addition, the system controller 4 executes a decoding including an error correction with respect to the read data and transmits the decoded data to the information processing device 2.

The memory 5 is, for example, a volatile memory and may be, for example, a synchronous dynamic random access memory (SDRAM) or a static random access memory (SRAM). The memory 5 stores the software such as the firmware 12 executed by the processor 6.

The processor 6 controls the decoder 7, the encoder 8, the register 9, the buffer memory 10, the memory controller 11, and the like by executing the firmware 12 stored in, for example, the memory 5.

In the first embodiment, the processor 6 executes a patrol read for the non-volatile memory 3. The processor 6 executes a reading and an error correction for an entire storage area or a partial storage area of the non-volatile memory 3 periodically or when a predetermined condition, such as occurrence of an event, is satisfied in the patrol read. The processor 6 determines the amount of wear or deterioration of the read source area in the non-volatile memory 3 based on an error correction result of data read by the corresponding patrol read, and functions as a change unit 13 that changes (more specifically, increases) the error correction capability for the read source area of the corresponding data as necessary based on the amount of wear or deterioration. Further, the result of the error correction is stored in the register 9.

The increase of the error correction capability may be implemented by increasing a ratio of a parity bit of the ECC for, for example, data as a target of the error correction.

In the example of FIG. 1, a state is exemplified in which the processor 6 reads the data D1 and Dn and the meta data M1 and Mn corresponding to the corresponding data D1 and Dn from the non-volatile memory 3 by the patrol read, and stores the data D1 and Dn and the metadata M1 and Mn in the buffer memory 10.

Hereinafter, a case where the data D1 stored in the buffer memory 10 is data to be processed will be described as an example, but the same is applied, for example, even to a case where other data such as the data Dn is the data to be processed. The data D1 to be processed includes a data body D and a parity bit De. The error correction capability of the data body D in the data D1 may be improved by increasing the bit number of the parity bit De.

The change unit 13 performs a determination whether or not correction result data 14 that is stored in the register 9 and indicating a decoding result by the decoder 7 for the data D1 indicates success and a determination whether or not an error correction bit number (the number of an error correction bit) 15 exceeds a threshold value.

When the correction result data 14 indicates a failure or when the error correction bit number 15 exceeds the threshold value, the change unit 13 updates the metadata M1 to increase the error correction capability for the read source area E1 of the data D1. The change unit 13 stores the corresponding data D1 in the buffer memory 10 in order to write the corresponding data D1 to another storage area (e.g., the storage area E2 managed as the metadata M2).

Increase of the error correction capability is implemented by newly writing data to the read source area E1 by updating, for example, the error correction capability information indicated by the metadata M1 that manages the error correction capability for the read source area E1 of the data D1 to information corresponding to a state in which the error correction capability has been increased.

The decoder 7 executes, for example, a low density parity check (LDPC) decoding.

More specifically, the decoder 7 refers to the data D1 that is read from the non-volatile memory 3 and stored in the buffer memory 10, and the metadata M1 corresponding to the read source area E1 of the corresponding data D1. Next, the decoder 7 executes a decoding including an error correction for the data D1 according to the error correction capability information indicated by the metadata M1, and detects the error correction bit number 15.

When the error correction is successful in the decoding, the decoder 7 stores the correction result data 14 that indicates success and the error correction bit number 15 that is detected by the error correction in the register 9, and stores the decoded data D1 in the buffer memory 10. When the decoding is unsuccessful, the decoder 7 stores the correction result data 14 indicating the failure in the register 9.

The encoder 8 performs, for example, an LDPC encoding. For example, the encoder 8 performs an encoding so as to change the error correction capability of the read source area E1 of the data D1. The encoder 8 refers to the metadata (e.g., the metadata M2) corresponding to the write destination area (e.g., the storage area E2), and includes the ECC in the data D1 to be written according to the error correction capability information included in the metadata M2 corresponding to the write destination area E2.

A part of operations of the decoder 7 and the encoder 8 are controlled by the processor 6.

The register 9 is used to exchange data among plural components of the system controller 4. For example, the decoder 7 stores the correction result data 14 and the error correction bit number 15 in the register 9, and the processor 6 acquires the correction result data 14 and the error correction bit number 15 from the register 9 so as to exchange the correction result data 14 and the error correction bit number 15 between the decoder 7 and the processor 6.

The buffer memory 10 stores metadata to be processed by the system controller 4 (e.g., metadata M1 corresponding to the read source area E1 and metadata M2 corresponding to the write destination area M2) and the data D1. The buffer memory 10 is implemented by cache memories for the metadata M1 and M2 and the data D1.

Specifically, the buffer memory 10 stores the metadata M1 and the data D1 which the memory controller 11 reads from the non-volatile memory 3. Further, the buffer memory 10 stores the data D1 which the memory controller 11 writes to the non-volatile memory 3, and the metadata M2 corresponding to the write destination area E2 which the memory controller 11 refers to while writing.

The memory controller 11 controls a reading and a writing of the metadata M1, the metadata M2 and the data D1 to the non-volatile memory 3. Further, the memory controller 11 controls an erasing operation of the non-volatile memory 3.

Specifically, the memory controller 11 stores the metadata M1 and M2, and the data D1 which the memory controller 11 reads from the non-volatile memory 3 in the buffer memory 10. Further, the memory controller 11 writes the metadata M1 and M2, and the data D1 stored in the buffer memory 10 to the non-volatile memory 3.

Figure 2:
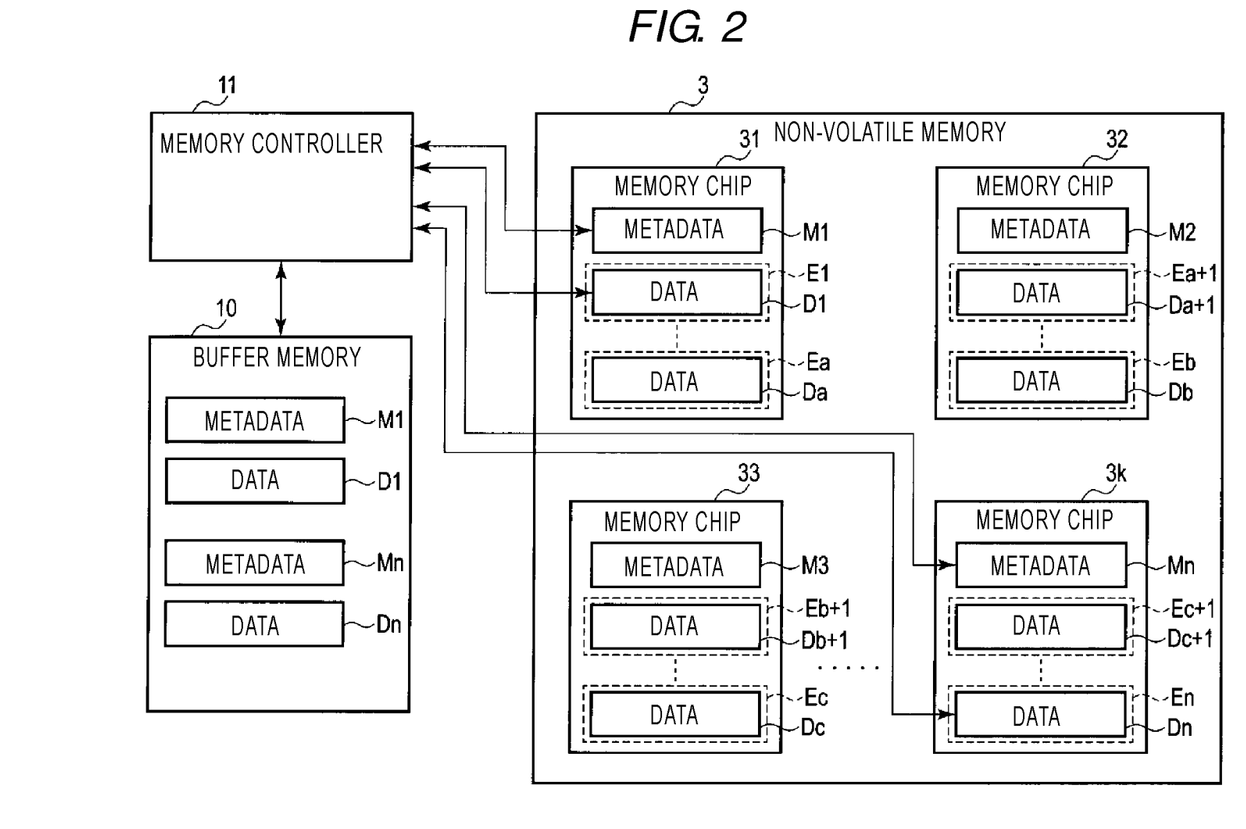
FIG. 2 is a block diagram illustrating examples of data and metadata stored in a buffer memory according to a first embodiment.

FIG. 2 is a block diagram illustrating examples of the metadata M1 and Mn and the data D1 and Dn stored in the buffer memory 10.

The non-volatile memory 3 includes plural memory chips 31 to 3*k*.

The memory chip 31 stores plural data D1 to Da in plural storage areas E1 to Ea, respectively, and stores metadata M1 corresponding to the plural storage areas E1 to Ea, respectively. The memory chip 32 stores plural data Da+1 to Db in plural storage areas Ea+1 to Eb, respectively, and stores metadata M2 corresponding to the plural storage areas Ea+1 to Eb, respectively. The memory chip 33 stores plural data Db+1 to Dc in plural storage areas Eb+1 to Ec, respectively, and stores metadata M3 corresponding to the plural storage areas Eb+1 to Ec, respectively. The memory chip 3*k* stores plural data Dc+1 to Dn in plural storage areas Ec+1 to En, respectively, and stores metadata Mn corresponding to the plural storage areas Ec+1 to En, respectively.

As described above, in FIG. 2, one metadata is associated with plural storage areas. Further, the memory chips 31 to 3*k* may store the data D1 to Dn and other memory chips may store the metadata M1 to Mn. Further, metadata corresponding to a storage area in a memory chip may be stored in the memory chip and stored in a memory chip different from the memory chip.

For example, when the data to be read is data D1 and Dn in the memory chips 31 and 3*k*, the memory controller 11 reads the data D1 and Dn and the metadata M1 and Mn from the memory chips 31 and 3*k* of the non-volatile memory 3. In addition, the memory controller 11 stores the data D1 and Dn and the metadata M1 and Mn in the buffer memory 10.

For example, when the data to be written is the data D1 or the metadata M1 of the buffer memory 10, the memory controller 11 stores the data D1 or the metadata M1 of the buffer memory 10 in the memory chip 31 of the non-volatile memory 3. For example, when the data to be written is the data Dn or the metadata Mn of the buffer memory 10, the memory controller 11 stores the data Dn or the metadata Mn in the memory chip 3*k*.

In the first embodiment, the system controller 4 determines the amount of wear or deterioration of the read source areas E1 and En of the corresponding data D1 and Dn in the non-volatile memory 3 based on the error correction results of the plural data D1 and Dn that is read from the non-volatile memory 3 and stored in the buffer memory 10, changes the error correction capabilities for the read source areas E1 and En of the corresponding data D1 and Dn as necessary based on the amount of wear or deterioration, and repeats the same process for other data that is read from the non-volatile memory 3 and stored in the buffer memory 10, thereby implementing the patrol read.

Figure 3:
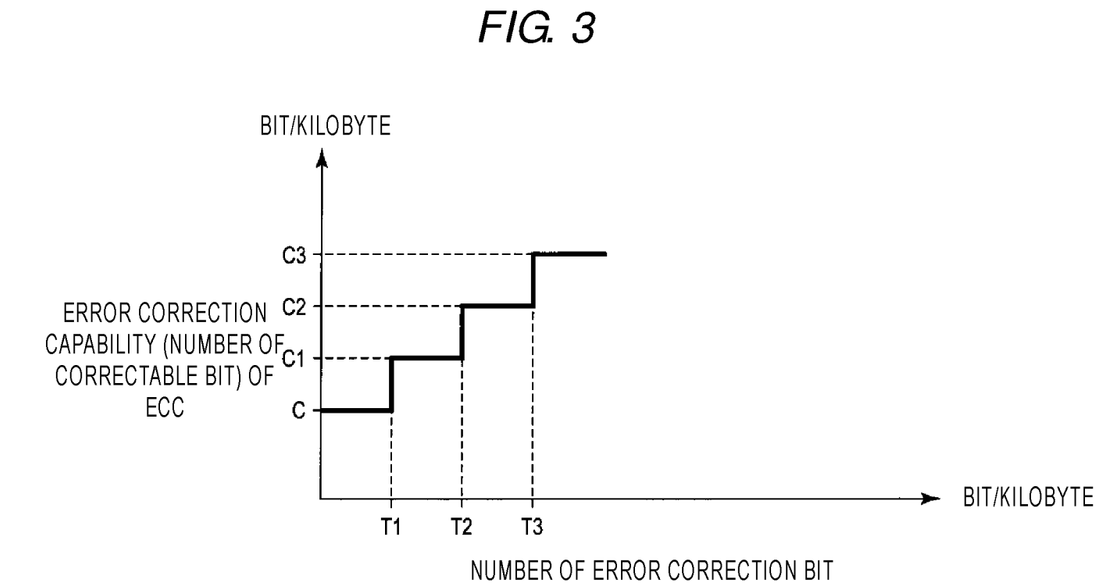
FIG. 3 is a graph illustrating an example of a relationship between an error correction bit number and an error correction capability of an ECC according to a first embodiment.

FIG. 3 is a graph illustrating an example of a relationship between an error correction bit number and an error correction capability of an ECC according to the first embodiment.

In FIG. 3, the horizontal axis indicates a bit number per predetermined size corrected by the decoder 7 (hereinafter, referred to as 1 kilobyte as an example). The bit number per 1 kilobyte corrected by the decoder 7 may be acquired based on a size of decoded data and the error correction bit number obtained as a decoding result.

In FIG. 3, the vertical axis indicates the error correction capability of the data and indicates, for example, the number of correctable bits per 1 kilobyte.

When the error correction bit number per 1 kilobyte of the data D1 to be processed, which is corrected by the decoder 7, is equal to or less than a first threshold value T1, the change unit 13 sets the error correction capability information of the metadata M1 corresponding to the read source area E1 of the corresponding data D1 (the number of correctable bits per 1 kilobyte) to the level C.

When the error correction bit number per 1 kilobyte of the data D1, which is corrected by the decoder 7, is more than the first threshold value T1 and equal to or less than a second threshold value T2, the change unit 13 changes the error correction capability information of the metadata M1 corresponding to the read source area E1 of the corresponding data D1 from the current level C to the level C1 higher than the current level C. Therefore, next, when the data is written to the read source area E1, the bit number of the ECC included in data written next by the encoder 8 is determined as a number corresponding to the level C1 according to the changed error correction capability information.

When the error correction bit number per 1 kilobyte of the data D1, which is corrected by the decoder 7, is more than the second threshold value T2 and equal to or less than a third threshold value T3, the change unit 13 changes the error correction capability information of the metadata M1 corresponding to the read source area E1 of the corresponding data D1 from the level C1 to the level C2 higher than the level C1. Therefore, next, when the data is written to the read source area E1, the bit number of the ECC included in data written next by the encoder 8 is determined as a number corresponding to the level C2 according to the changed error correction capability information.

When the error correction bit number per 1 kilobyte of the data D1, which is corrected by the decoder 7, is more than the third threshold value T3, the change unit 13 changes the error correction capability information of the metadata M1 corresponding to the read source area E1 of the corresponding data D1 from the level C2 to the level C3 higher than level C2. Therefore, next, when the data is written to the read source area E1, the bit number of the ECC included in data written next by the encoder 8 is determined as a number corresponding to the level C3 according to the changed error correction capability information.

In the first embodiment, the change unit 13 changes the error correction capability information in the metadata M1 and uses the decoder 7 and the encoder 8 to increase the bit number of the ECC that is included in the data stored in the storage area E1 managed by the metadata M1.

Figure 4:
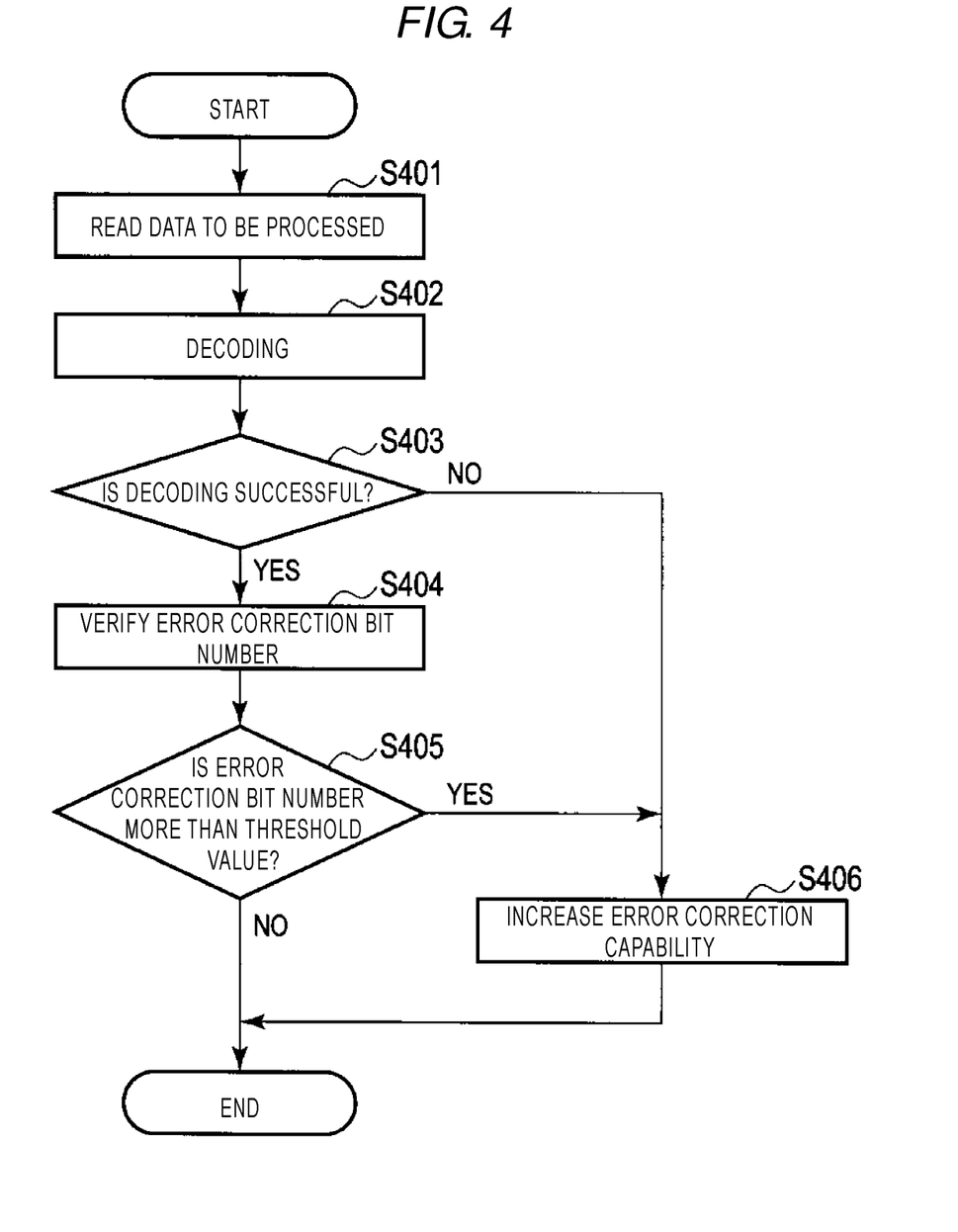
FIG. 4 is a flowchart illustrating an example of a process of a memory system according to a first embodiment.

FIG. 4 is a flowchart illustrating an example of a process of a memory system 1 according to the first embodiment. FIG. 4 illustrates a process executed when the system controller 4 performs the patrol read for the non-volatile memory 3. The patrol read is a background process executed in a period when a command process from the information processing device 2 is not executed or is executed in parallel.

In S401, the change unit 13 of the processor 6 reads the data D1 to be processed and the metadata M1 corresponding to the read source area E1 of the corresponding data D1 from the non-volatile memory 3 by using the memory controller 11, and stores the read data D1 and metadata M1 in the buffer memory 10.

In S402, the change unit 13 decodes the data D1 stored in the buffer memory 10 to the decoder 7 based on the error correction capability information for the read source area E1 of the data D1 included in the metadata M1. When the decoding is successful, that is, when there is no error which may not be corrected as a result of the decoding, the decoder 7 stores the correction result data 14 indicating the success and the error correction bit number 15 in the register 9. When the decoding is unsuccessful, that is, when there is an error which may not be corrected as the result of the decoding, the decoder 7 stores the correction result data 14 indicating the failure in the register 9.

In S403, the change unit 13 determines whether or not the correction result data 14 of the register 9 indicates a successful decoding. When it is determined that the correction result data 14 indicates a successful decoding ("YES" in S403), the change unit 13 verifies (e.g. determines, checks, confirms) the error correction bit number 15 stored in the register 9 in S404.

In S405, the change unit 13 determines whether or not the error correction bit number 15 exceeds any one of the first to third threshold values T1 to T3.

When it is determined that the error correction bit number 15 does not exceed all of the first to third threshold values T1 to T3 ("NO" in S405), the process is terminated without changing the error correction capability.

When the error correction bit number 15 exceeds any one of the first to third threshold values T1 to T3 ("YES" in S405) or when it is determined that the correction result data 14 indicates an unsuccessful decoding in S403 ("NO" in S403), the change unit 13 updates (specifically, increases) the error correction capability information for the read source area E1 of the data D1 indicated by the metadata M1 stored in the buffer memory 10 in S406. Further, the change unit 13 (processor 6) may update the error correction capability information of the read source area E1 of the data D1 and write the data D1 to the write destination area E2 of the no-volatile memory 3 via the memory controller 11.

An effect obtained by the memory system 1 according to the first embodiment described above will be described by comparing the corresponding memory system 1 and a memory system of a comparative example.

In the memory system of the comparative example, it is assumed that when the correction result data obtained by the decoding indicates the successful decoding, the error correction capability regarding the read source area of the data to be processed is not increased, but when the correction result data indicates the unsuccessful decoding, the error correction capability of the read source area of the data to be processed is increased.

In the process executed by the memory system of the comparative example, only a correction result is used for determining an amount of wear or deterioration of the non-volatile memory, and as a result, it is difficult to precisely determine the amount of wear or deterioration of the non-volatile memory and adjust a level of the error correction capability.

In order to enhance determination accuracy of the amount of wear or deterioration, the memory system of the comparative example may repeat multiple readings by changing a reading condition of data from the non-volatile memory and perform a synthetic determination by the result of repeatedly executed corresponding readings to enhance the determination accuracy of the amount of wear or deterioration. However, when reading is repeatedly performed as described above, the number of reading times increases and the non-volatile memory may be impoverished by repetition of the reading, and device performance such as a throughput may be degraded in regard to the memory system of the comparative example.

Contrary to this, the memory system 1 according to the first embodiment determines the amount of wear or deterioration of the non-volatile memory 3 according to the error correction bit number detected by the decoding even when the result of the decoding indicates the success in addition to the case where the result of the decoding indicates the failure. Therefore, in the memory system according to the first embodiment, the accuracy of the determination of the amount of wear or deterioration of the non-volatile memory 3 may be enhanced compared to the memory system of the comparative example, and the error correction capability may be set according to the amount of wear or deterioration with respect to the data written to the non-volatile memory 3.

In the first embodiment, a case where the decoder 7 and the encoder 8 perform an LDPC decoding and an LDPC encoding, respectively, has been described as an example, but another error correction in which an error correction number is acquired may be used instead of error correction using the LDPC.

When respective components of the memory system 1 according to the first embodiment may implement the same function, the respective components may be freely divided or combined. For example, the decoder 7 and the encoder 8 may be formed by one circuit. The register 9 and the buffer memory 10 may be combined.

Second Embodiment

In the first embodiment, an increase of the error correction capability in response to the executing of the patrol read has been described. In a second embodiment, an increase of the error correction capability when the memory system 1 receives a read command from the information processing device 2 will be described.

Figure 5:
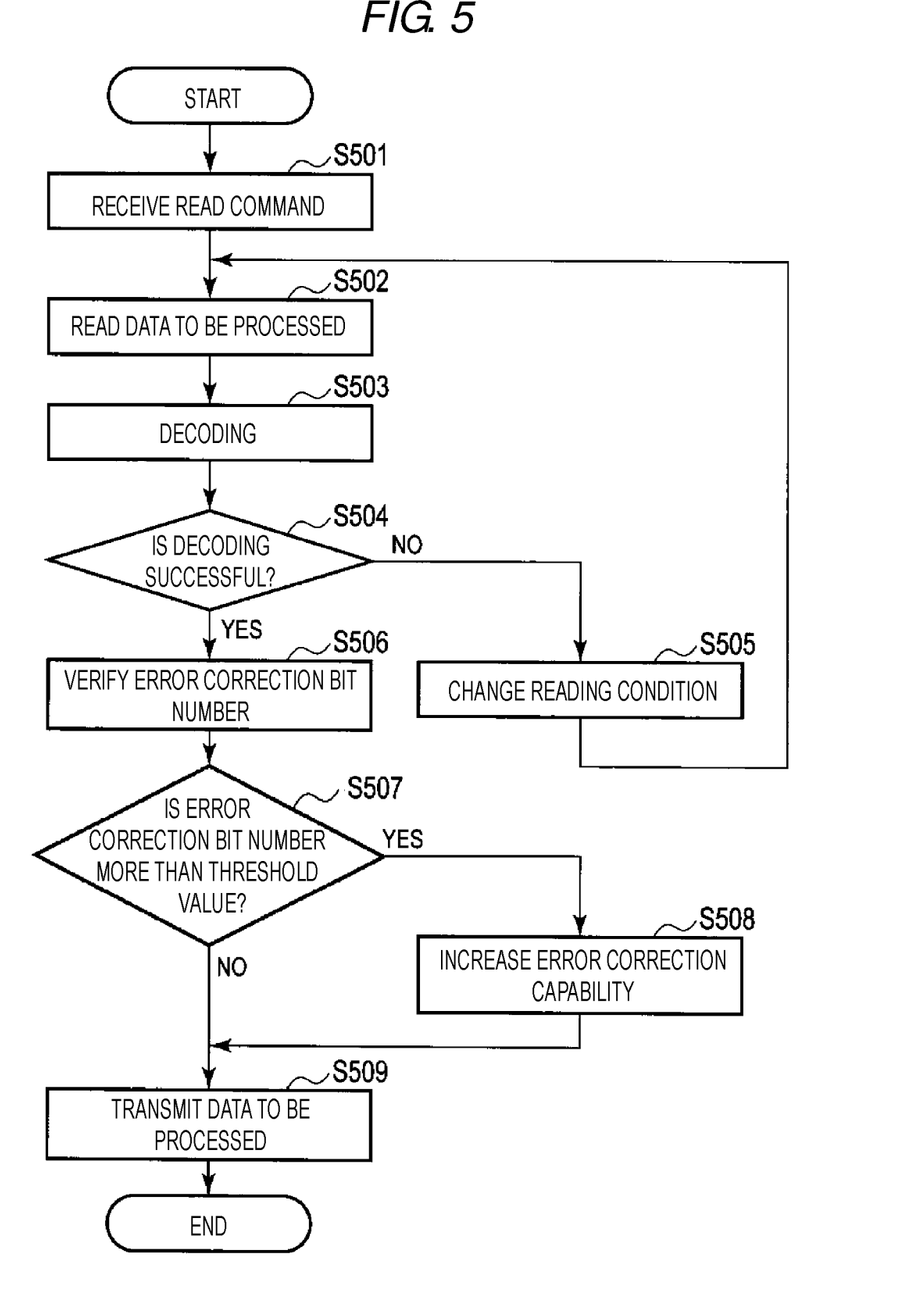
FIG. 5 is a flowchart illustrating an example of a process of a memory system according to a second embodiment.

FIG. 5 is a flowchart illustrating an example of a process of a memory system 1 according to the second embodiment.

In S501, the system controller 4 receives the read command from the information processing device 2.

In S502, when the processor 6 receives the read command, the processor 6 reads the data D1 to be processed and the metadata M1 corresponding to the read source area E1 of the data D1 to be processed from the non-volatile memory 3 by using the memory controller 11, and stores the read data D1 and metadata M1 in the buffer memory 10.

In S503, the change unit 13 decodes the data D1 stored in the buffer memory 10 to the decoder 7 based on the error correction capability information for the read source area E1 of the data D1 included in the metadata M1. When the decoding is successful, the decoder 7 stores the correction result data 14 indicating the success and the error correction bit number 15 in the register 9. When the decoding is unsuccessful, the decoder 7 stores the correction result data 14 indicating the failure in the register 9.

In S504, the change unit 13 determines whether or not the correction result data 14 of the register 9 indicates successful decoding.

When the correction result data 14 indicates the unsuccessful decoding ("NO" in S504), the processor 6 changes the reading condition used in the non-volatile memory 3 in S505. The processor 6 changes read voltage used in, for example, the non-volatile memory 3. Then, the process returns to S502. As a result, re-reading of the data D1 by different reading conditions is performed. As described above, performing a reading by changing a setting value of the read voltage for the non-volatile memory 3 is referred to as shift read.

When the correction result data 14 indicates successful decoding ("YES" in S504), the change unit 13 verifies (e.g. determines, checks, confirms) the error correction bit number 15 stored in the register 9 in S506.

In S507, the change unit 13 determines whether or not the error correction bit number 15 exceeds any one of the first to third threshold values T1 to T3.

When it is determined that the error correction bit number 15 does not exceed all of the first to third threshold values T1 to T3 ("NO" in S507), the process moves to S509 without changing the error correction capability.

When it is determined that the error correction bit number 15 exceeds any one of the first to third threshold values T1 to T3 ("YES" in S507) the change unit 13 updates (specifically, increases) the error correction capability information for the read source area E1 of the data D1 indicated by the metadata M1 stored in the buffer memory 10 in S508. Further, the processor 6 may update the error correction capability information of the read source area E1 of the data D1 and write the data D1 to the write destination area E2 of the non-volatile memory 3 via the memory controller 11. Thereafter, the process moves to S509.

In S509, the system controller 4 transmits the data D1 stored in the buffer memory 10 to the information processing device 2.

In the second embodiment described above, when the memory system 1 receives the read command from the information processing device 2, the memory system 1 reads the data D1 corresponding to the read command from the non-volatile memory 3 and transmits the data D1 to the information processing device 2. In addition to the read operation, the memory system 1 may determine the amount of wear or deterioration of the non-volatile memory 3 for the read source area E1 of the data D1 with high accuracy according to the error correction bit number 15 detected by the decoding of the data D1, thereby changing the error correction capability information of the metadata M1 corresponding to the read source area E1 according to the amount of wear or deterioration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
   a non-volatile memory; and
   a controller configured to:
   perform an error correction on data read from a memory region of the non-volatile memory;
   determine whether the error correction is successful; and
   set a value of a parameter corresponding to a number of parity bits to be added to write data to be written into the memory region based on a number of data bits corrected in the error correction of the read data when determining that the error correction is successful, wherein the controller is configured to increase the value of the parameter to a first value in a case where the number of data bits corrected is greater than a first threshold and less than a second threshold, and increase the value of the parameter to a second value greater than the first value in a case where the number of data bits corrected is greater than the second threshold.

2. The memory system according to claim 1, wherein the parameter includes a number of parity bits to be added to write data of a unit size.

3. The memory system according to claim 1, wherein the parameter includes a ratio of parity bits to data bits of write data.

4. The memory system according to claim 1, wherein the controller is further configured to maintain a current value of the parameter in a case where the number of data bits corrected is less than a third threshold, and increase the value of the parameter in a case where the number of data bits corrected is greater than the third threshold.

5. The memory system according to claim 1, wherein the controller is further configured to increase the value of the parameter when determining that the error correction of the data is unsuccessful.

6. The memory system according to claim 1, wherein the controller is further configured to retry reading of the data from the memory region with a changed reading condition when determining that the error correction of the data is unsuccessful.

7. The memory system according to claim 1, wherein the controller includes:

a decoder configured to perform the error correction of data read from the memory region and output the number of the data bits corrected in the error correction; and an encoder configured to perform error correction encoding of the write data by adding parity bits of the number corresponding to the value of the parameter.

8. The memory system according to claim 1, wherein the controller is further configured to set the value of the parameter in a case where the data are read from the memory region during a read process in response to a read command.

9. The memory system according to claim 1, wherein the controller is further configured to set the value of the parameter in a case where the data are read from the memory region during a background process.

10. The memory system according to claim 1, wherein the controller is further configured to store the value of the parameter into a second memory region of the non-volatile memory.

11. The memory system according to claim 1, wherein the controller is further configured to:

perform an error correction decoding on first data read from a first memory region of the non-volatile memory;

set a value of a first parameter corresponding to a number of parity bits to be added to write data to be written into the first memory region based on a number of data bits corrected in the error correction decoding of the read first data;

perform an error correction decoding of second data read from a second memory region of the non-volatile memory; and set a value of a second parameter corresponding to a number of parity bits to be added to write data to be written into the second memory region based on a number of data bits corrected in the error correction decoding of the read second data.

12. A memory system, comprising:

a non-volatile memory including a first non-volatile memory and a second non-volatile memory; and a controller configured to:

perform an error correction on first data read from the first non-volatile memory;

determine whether the error correction on the first data is successful;

set a value of a first parameter corresponding to a number of parity bits to be added to first write data to be written into the first non-volatile memory based on a number of data bits corrected in the error correction of the read first data when determining that the error correction on the first data is successful, wherein the controller is configured to increase the value of the first parameter to a first value in a case where the number of data bits corrected in the error correction of the read first data is greater than a first threshold and less than a second threshold, and increase the value of the first parameter to a second value greater than the first value in a case where the number of data bits corrected in the error correction of the read first data is greater than the second threshold;

perform an error correction on second data read from the second non-volatile memory;

determine whether the error correction on the second data is successful; and set a value of a second parameter corresponding to a number of parity bits to be added to second write data to be written into the second non-volatile memory based on a number of data bits corrected in the error correction of the read second data when determining that the error correction on the second data is successful, wherein the controller is configured to increase the value of the second parameter to a third value in a case where the number of data bits corrected in the error correction of the read second data is greater than a third threshold and less than a fourth threshold, and increase the value of the second parameter to a fourth value greater than the third value in a case where the number of data bits corrected in the error correction of the read second data is greater than the fourth threshold.

13. The memory system according to claim 12, wherein the controller includes:

a decoder configured to perform error correction decoding; and an encoder configured to perform error correction encoding.

14. The memory system according to claim 12, wherein the controller is further configured to set the value of the first parameter in a case where the first data are read from the first non-volatile memory during a read process in response to a read command, and set the value of the second parameter during a background process with respect to the second non-volatile memory.

15. The memory system according to claim 12, wherein the controller is further configured to store the value of the first parameter into the first non-volatile memory and the value of the second parameter into the second non-volatile memory.

16. A method for controlling a memory system including a non-volatile memory, the method comprising:

performing an error correction on data read from a memory region of the non-volatile memory;

determining whether the error correction is successful; and setting a value of a parameter corresponding to a number of parity bits to be added to write data to be written into the memory region based on a number of data bits corrected in the error correction of the read data when determining that the error correction is successful, wherein said setting the value of the parameter comprises:

increasing the value of the parameter to a first value in a case where the number of data bits corrected is greater than a first threshold and less than a second threshold; and increasing the value of the parameter to a second value greater than the first value in a case where the number of data bits corrected is greater than the second threshold.

17. The method according to claim 16, wherein said setting the value of the parameter comprises:

maintaining a current value of the parameter in a case where the number of data bits corrected is less than a third threshold; and increasing the value of the parameter in a case where the number of data bits corrected is greater than the third threshold.

18. The method according to claim 16, further comprising:

increasing the value of the parameter when determining that the error correction of the data is unsuccessful.

* * * * *

UNITED STATES PATENT AND TRADEMARK OFFICE
CERTIFICATE OF CORRECTION

| | |
|---|---|
| PATENT NO. | : 11,269,704 B2 |
| APPLICATION NO. | : 16/553438 |
| DATED | : March 8, 2022 |
| INVENTOR(S) | : Takahiro Masakawa |

It is certified that error appears in the above-identified patent and that said Letters Patent is hereby corrected as shown below:

On the Title Page

Item (71) Applicant: please delete "Toshiba Memory Corporation, Tokyo, (JP)" and insert --KIOXIA CORPORATION, Tokyo, (JP)--.

Signed and Sealed this
Thirty-first Day of January, 2023

Katherine Kelly Vidal
*Director of the United States Patent and Trademark Office*